US012111199B2

United States Patent
Baureithel et al.

(10) Patent No.: US 12,111,199 B2
(45) Date of Patent: Oct. 8, 2024

(54) METHOD FOR DATA COMPRESSION DURING FILL LEVEL MEASUREMENT

(71) Applicant: Endress+Hauser SE+Co. KG, Maulburg (DE)

(72) Inventors: Johannes Baureithel, Wehr (DE); Markus Vogel, Schopfheim (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 480 days.

(21) Appl. No.: 17/416,194

(22) PCT Filed: Nov. 21, 2019

(86) PCT No.: PCT/EP2019/082033
§ 371 (c)(1),
(2) Date: Jun. 18, 2021

(87) PCT Pub. No.: WO2020/126279
PCT Pub. Date: Jun. 25, 2020

(65) Prior Publication Data
US 2022/0057249 A1 Feb. 24, 2022

(30) Foreign Application Priority Data
Dec. 21, 2018 (DE) .................. 10 2018 133 299.8

(51) Int. Cl.
*G01F 23/284* (2006.01)
(52) U.S. Cl.
CPC ................... *G01F 23/284* (2013.01)

(58) Field of Classification Search
None
See application file for complete search history.

(56) References Cited

U.S. PATENT DOCUMENTS

2010/0307251 A1* 12/2010 Welle ............... G01S 7/4866
367/87
2011/0166805 A1 7/2011 Hammer et al.
2017/0016754 A1 1/2017 Fischer et al.
2017/0356988 A1* 12/2017 McKerracher ...... G01S 7/2813
(Continued)

FOREIGN PATENT DOCUMENTS

DE 10024959 A1 12/2001
WO 2006052122 A1 5/2006

*Primary Examiner* — Whitney Moore
(74) *Attorney, Agent, or Firm* — Christopher R. Powers; Endress+Hauser (USA) Holding, Inc.

(57) ABSTRACT

The present disclosure relates to a method for compressing an evaluation curve, which is recorded during a radar-based fill level measurement of a filling material located in a container, and to a corresponding fill level measurement device for carrying out the method. Corresponding to the compression method according to the present disclosure, the present disclosure comprises a corresponding method for decompressing the compressed evaluation curve. The compression method is characterized in that the compression occurs using linear prediction, by corresponding estimation coefficients and an error curve being created. This makes use of the finding according to the present disclosure that evaluation curves can be compressed for diagnostic purposes, in particular in the case of FMCW-based fill level measurement, efficiently and without data loss using the model of linear prediction.

10 Claims, 2 Drawing Sheets

(56) References Cited

U.S. PATENT DOCUMENTS

2020/0128307 A1* 4/2020 Li ........................ H04N 19/119
2020/0348422 A1* 11/2020 Carcanague ............ G01S 19/07
2020/0364545 A1* 11/2020 Shattil ...................... G06N 3/08

* cited by examiner

METHOD FOR DATA COMPRESSION DURING FILL LEVEL MEASUREMENT

CROSS-REFERENCE TO RELATED APPLICATIONS

The present application is related to and claims the priority benefit of German Patent Application No. 10 2018 133 299.8, filed on Dec. 21, 2018 and International Patent Application No. PCT/EP2019/082033, filed on Nov. 21, 2019, the entire contents of which are incorporated herein by reference.

TECHNICAL FIELD

The invention relates to a method for data compression of an evaluation curve during a radar-based fill level measurement, and to a fill level measurement device for carrying out this method.

BACKGROUND

In process automation technology, field devices for capturing or modifying process variables are generally used. For this purpose, the functioning of the field devices is in each case based on suitable measuring principles in order to capture the corresponding process variables, such as fill level, flow rate, pressure, temperature, pH value, redox potential or conductivity. A wide variety of such field devices is manufactured and distributed by the Endress+Hauser company.

For measuring the fill level of filling materials in containers, radar-based measuring methods have become established since they are robust and require minimum maintenance. Within the scope of the invention, the term "container" is also understood to mean containers that are not closed, such as basins, lakes or flowing bodies of water. A key advantage of radar-based measuring methods lies in their ability to measure the fill level quasi-continuously. In the context of this patent application, the term "radar" refers to microwave signals having frequencies between 0.03 GHz and 300 GHz. Typical frequency bands with which fill level measurement is performed are 2 GHz, 6 GHz, 26 GHz or 79 GHz. The higher the frequency band selected, the narrower the beam cone in which the microwave signal is emitted.

In the case of radar-based fill level measurement, the pulse time-of-flight principle is an established measuring principle. Here, pulse-shaped microwave signals are emitted cyclically in the direction of the filling material and the time of flight until reception of the corresponding pulse-shaped receive signal is measured. On the basis of this measuring principle, fill level measurement devices can be realized with comparatively low circuitry complexity.

If a more complex circuit technology can be accepted, FMCW (frequency-modulated continuous wave) is a possible measuring principle for radar-based fill level measurement. This measuring principle is based on the fact that the microwave signal is transmitted continuously, but with a modulated frequency. In this case, the frequency of the microwave signal lies within a defined frequency band in the region of a standardized center frequency. Characteristic of FMCW is here that the transmission frequency is not constant but changes periodically within the defined frequency band. At a center frequency of 79 GHz, the frequency band is, for example, 2 GHz, that is, from 78 GHz to 80 GHz. With FMCW as well, the emission or reception of the microwave signals is divided into successive measuring cycles.

The change in frequency over time is linear by default for FMCW, and has a sawtooth or triangular shape. However, a sinusoidal change can in principle also be used. In contrast to the pulse time-of-flight method, the distance or the fill level when implementing the FMCW method is determined on the basis of the instantaneous frequency difference between the current receive signal and the just emitted microwave signal.

The measurement principle of FMCW and the pulse time-of-flight method is described for example in "*Radar Level Detection*, Peter Devine, 2000." With both measuring principles, a corresponding evaluation curve is recorded on the basis of the receive signal in order to ascertain the fill level. In the case of the pulse radar-based method, due to the high pulse frequency, the evaluation curve is generated by undersampling the reflected receive signal. As a result, the evaluation curve represents the actual reflected receive signal in a time-expanded way. When implementing the FMCW method, the evaluation curve is generated by mixing the just transmitted microwave signal with the reflected receive signal.

In the normal measuring operating mode, the fill level is determined directly after the measurement or directly after the evaluation curve has been recorded. This is done by detecting the corresponding local signal maximum of the filling material surface in the evaluation curve and assigning the corresponding distance value. In the ideal case, there is no other maximum in the evaluation curve besides the maximum generated by the filling material surface.

For diagnostic purposes, for example if the maximum cannot be unambiguously derived from the evaluation curve, as a rule, the underlying evaluation curve is stored. For diagnosis, the evaluation curve can then be read out, for example, by a service technician or transmitted to a superordinate unit such as a process control system. The underlying disturbance can often be determined on the basis of corresponding diagnosis, for example the failure of an antenna due to the build-up of residue. Any disturbances can thus be rectified in a targeted manner.

On the one hand, the storage capacity in fill level measurement devices is, as a rule, greatly limited on account of the simple computer architecture in field devices, since they have to operate with minimized power. On the other hand, the data transmission to superordinate units is effected predominantly by means of analog signals or digital transmission protocols with a low baud rate. For these reasons, it is desirable to store or transmit the recorded evaluation curves in a compressed manner in the case of radar-based fill level measurement. In the case of heavily compressed evaluation curves, however, considerable data loss can then occur, as a result of which subsequent diagnosis based on the decompressed evaluation curves becomes impossible.

SUMMARY

The invention is therefore based on the object of providing a method for compressing evaluation curves during a radar-based fill level measurement, with which the compressed evaluation curve can be decompressed without data loss.

The invention achieves this object by a method for compressing an evaluation curve, which is recorded during a radar-based fill level measurement of a filling material located in a container. The method comprises the following method steps:

emitting a radar signal in the direction of the filling material, receiving a receive signal after reflection of the radar signal inside the container, recording an evaluation curve on the basis of at least the receive signal, and generating an approximated evaluation curve and associated estimation coefficients by means of linear prediction of the evaluation curve, and generating an error curve by subtracting the approximated evaluation curve from the evaluation curve.

Thus, the evaluation curve in compressed form is represented only by the estimation coefficients, the model of linear prediction itself, and the error curve.

The invention is thus based on the knowledge that evaluation curves, especially in the case of FMCW-based fill level measurement, can be compressed efficiently and without data loss by means of the model of linear prediction. On a corresponding external diagnostic unit, for example a mobile handheld device or a superordinate process control unit, only the model of linear prediction as such must therefore be implemented for decompressing the evaluation curve. In order to decompress evaluation curves of the fill level measurement device, accordingly, only the estimation coefficients and the error curve, but not the complete evaluation curve, have to be transmitted to the diagnostic unit.

The sum of the data volume to be transmitted, i.e. the data volume of the estimation coefficients plus the data volume of the error curve, can be minimized as a whole if the estimation coefficients are calculated iteratively. Thereby, a further estimation coefficient and the mean square deviation of the error curve are calculated per iteration. The data volume for the error curve can be estimated from the mean square deviation. The data volume of the estimation coefficients must thus be determined in each iteration, and the data volume of the error curve must at least be estimated. Such data volumes are summed. It is thus possible to determine a local or global minimum of the summed data volume (within certain iteration limits). Accordingly, the iteration must be terminated as soon as the sum of data, i.e. the data volume of the estimation coefficients plus the possibly estimated data volume of the error curve, is minimal. This can be implemented, for example, by setting up a so-called "Wiener-Hopf equation system" and iterative solution of this equation system, for example by means of the so-called "Levinson-Durbin recursion."

The data volume to be transmitted can be further reduced if the error curve is also compressed especially by means of entropy coding. In this case, a compressed error curve is generated by the entropy coding on the basis of the error curve and its corresponding statistical properties. For example, a logistic distribution can be used as a distribution model for the error curve, such that only the standard deviation of the error curve is to be determined as the static property (the mean value always equals zero). As the data compression method for entropy coding, "range coding" or "Golomb coding" can be implemented.

If the error curve is also compressed, the following method steps for restoring the original evaluation curve are correspondingly required:

generating the decompressed error curve by means of entropy decoding of the compressed error curve according to its statistical properties, restoring the approximated evaluation curve by means of the estimation coefficients on the basis of the model of linear prediction, and restoring the evaluation curve by means of addition of the decompressed error curve and the approximated evaluation curve.

The evaluation curve is thus restored incrementally from the estimation coefficients, the model of linear prediction and the decompressed error curve. The next value of the approximated evaluation curve is determined point by point and added to the corresponding point of the error curve in order to obtain the corresponding point of the evaluation curve. The next step of the approximated evaluation curve can then be calculated from this point of the evaluation curve, and the corresponding value for the evaluation curve can then be calculated with the next point of the error curve.

A radar-based fill level measurement device for performing the compression method according to the invention has to comprise the components designed as follows:

a signal-generating unit designed to emit a radar signal in the direction of the filling material, a receiving unit designed to receive a corresponding receive signal after reflection of the radar signal inside the container, an evaluation unit designed to generate an evaluation curve on the basis of at least the receive signal, generate an approximated evaluation curve and its estimation coefficients by means of at least one linear prediction of the evaluation curve, generate an error curve by subtracting the evaluation curve from the approximated evaluation curve, and determine the fill level on the basis of the evaluation curve or the estimation coefficients, and an interface by means of which the estimation coefficients, the (compressed) error curve and, if applicable, their statistical data can be transmitted, and/or a memory designed to store the estimation coefficients, the (compressed) error curve and their statistical data.

Since the compression can be used efficiently especially when the evaluation curve was generated on the basis of the FMCW principle, it is advantageous within the scope of the invention if the signal-generating unit, the receiving unit and the evaluation unit are designed to determine the fill level on the basis of the FMCW principle. It is also advantageous if the evaluation unit is designed to perform the linear prediction on the basis of the lattice filter model. In this case, the estimation coefficients are present as relative values in a range of values between 0 and 1, such that data volume of the estimation coefficients and the error curve can be iteratively minimized.

With reference to the fill level measurement device, the term "unit" within the scope of the invention is understood in principle to mean any electronic circuit that is suitably designed for the respective intended purpose. Depending on the requirement, it can therefore be an analog circuit for generating or processing corresponding analog signals. However, it can also be a (semiconductor-based) digital circuit such as a microcontroller or a storage medium in interaction with a program. In this case, the program is designed to perform the corresponding method steps or to apply the necessary calculation operations of the respective unit. In this context, various electronic units of the fill level measurement device in the sense of the invention can potentially also access a common physical memory or be operated by means of the same physical digital circuit.

BRIEF DESCRIPTION OF THE DRAWINGS

The invention is explained in more detail with reference to the following figures. The following is shown.

DETAILED DESCRIPTION

Figure 1:
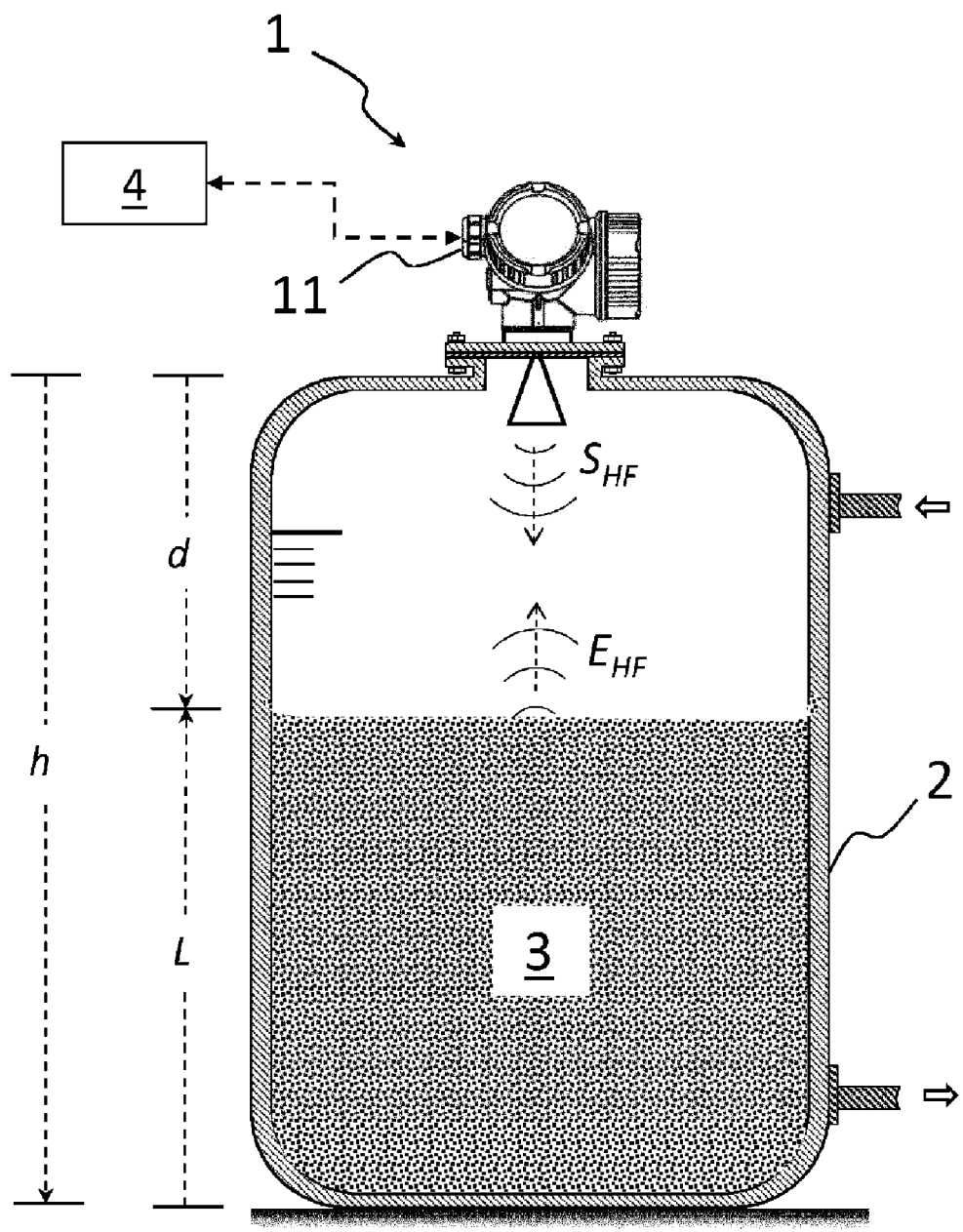
FIG. 1 shows a typical arrangement of a radar-based fill level measurement device on a container.

For a basic understanding of the invention, FIG. 1 shows a typical arrangement of a freely radiating, radar-based fill level measurement device 1 on a container 2. In the container 2 is a filling material 3, whose fill level L is to be determined by the fill level measurement device 1. For this purpose, the fill level measurement device 1 is mounted on the container 2 above the maximum permissible fill level L. Depending on the field of application, the installation height h of the fill level measurement device 1 above the container bottom can be up to more than 100 m.

As a rule, the fill level measurement device 1 can be connected via an interface 11, which is based on a corresponding bus system such as "Ethernet," "PROFIBUS," "HART" or "Wireless HART," to a superordinate unit 4, for example a process control system, a decentralized database or a handheld device such as a mobile radio device. On the one hand, information about the operating status of the fill level measurement device 1 can thus be communicated. However, further information with regard to the fill level L can also be transmitted via the interface 11 in order to control any inflows or outflows that may be present at the container 2.

Since the fill level measurement device 1 shown in FIG. 1 is designed as freely radiating radar, it comprises a corresponding antenna. As indicated, the antenna can be designed as a horn antenna, for example. The fill level measurement device 1 is oriented in such a manner that corresponding radar signals $S_{HF}$ are emitted in the direction of the filling material 3. Thereby, the radar signals $S_{HF}$ are generated in a signal-generating unit of the fill level measurement device 1 designed for this purpose, depending on the measuring method (pulse time-of-flight or FMCVV).

The radar signals $S_{HF}$ are reflected at the surface of the filling material 3 and received after a corresponding signal propagation time by the antenna or a downstream receiving unit of the fill level measurement device 1 as receive signals $E_{HF}$. The fill level L can be determined from the receive signals $E_{HF}$, since the signal propagation time of the radar signals $S_{HF}$, $E_{HF}$ depends on the distance d=h−L of the fill level measurement device 1 to the filling material surface.

In order to determine the fill level L, an evaluation unit of the fill level measurement device 1 generates a digital, time-discrete evaluation curve x[n] on the basis of the receive signal $E_{HF}$. When implementing the FMCW method, the evaluation unit generates the evaluation curve x[n] in principle by mixing the currently received receive signal $E_{HF}$ with the just transmitted radar signal $S_{HF}$, wherein the radar signal $S_{HF}$ is transmitted continuously for this purpose with a sawtooth-shaped frequency change. Thereby, the frequency of the evaluation curve x[n] has a proportional dependence on the distance d to the filling material surface, such that the fill level L can be determined on the basis of the measured frequency. In reality, the frequency is superimposed by additional frequency components due to interfering influences. Therefore, in the case of FMCW, the evaluation curve x[n] is subjected to a Fourier transform to determine the frequency.

In the case of the pulse time-of-flight method, the evaluation curve x[n] is generated by undersampling the pulse-shaped receive signal $E_{HF}$, wherein the pulse frequency of the sampling signal for this purpose differs by less than one per mill from the pulse frequency of the transmitted radar signal $S_{HF}$ or of the receive signal $E_{HF}$.

Depending on the functionality of the fill level measurement device 1, it can occur during the measuring operation that no fill level L can be determined from the recorded evaluation curve x[n]. The cause for this can be, for example, an antenna with the build-up of residue. However, there can also be a disturbance in the container itself, for example if reflective interfering bodies are present in the container 2. Thereby, the causes of such any disturbances can be, as a rule, detected by trained specialist personnel on the basis of the evaluation curve x[n]. However, since the evaluation curve x[n] are re-recorded with clock rates of 10 Hz or higher, a prophylactic storage of all recorded evaluation curves x[n] is not possible due to limited memory resources in the fill level measurement device 1. Moreover, any transmission of the evaluation curves x[n] via the interface 11 of the fill level measurement device 1, for example to the superordinate unit 4, in uncompressed form of the evaluation curves x[n] is also only possible at least very slowly, since the interface protocols of field devices are also primarily designed to be power-optimized and correspondingly slow.

Figure 2:
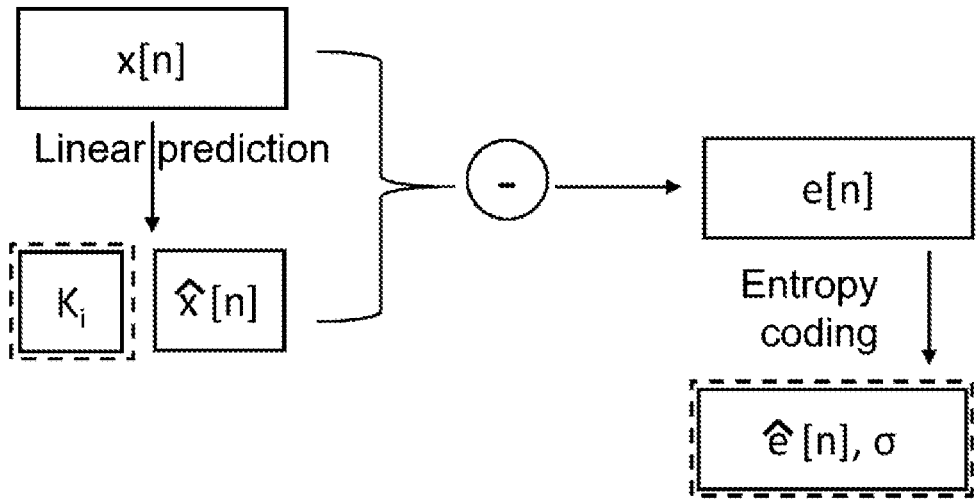
FIG. 2 shows the method sequence according to the invention for compressing the evaluation curve.

The method according to the invention, with which the evaluation curve x[n] can be compressed, is therefore illustrated in more detail with reference to FIG. 2:

According to the method according to the invention, initially the quantized evaluation curve x[n] is approximated by means of the model of linear prediction, as described, for example, in "*The Theory of Linear Prediction*," P. P. Vaidyanathan, Morgan&Claypool, 2008. This results, on the one hand, in the approximated evaluation curve $\hat{x}[n]$ and corresponding estimated coefficients $K_i$.

The model is based on autoregression, i.e., estimation of the upcoming values $\hat{x}[n]$ of the evaluation curve x[n] based on previous values x[n−i] of the evaluation curve x[n]:

$$\hat{x}[n] = -\sum_{i=1}^{N} p_i x[n-i]$$

Here, $p_i$ are the filter coefficients for the direct shape of an FIR filter. If, instead, an FIR filter in lattice form is present (see FIG. 3), the corresponding filter coefficients are referred to here as estimation coefficients $K_i$. Filter coefficients $p_i$ and estimation coefficients $K_i$ can be converted into one another. N is the order of the FIR filter, which is increased by 1 with each iteration. This iterative calculation makes it possible to describe the original evaluation curve x[n] on the basis of the previously described mathematical model, which is based on linear prediction, and the corresponding estimation coefficient $K_i$. Thus, to decompress the evaluation curve x[n], in the compressed case only the estimation coefficients $K_i$ and the error curve e[n] have to be stored or transmitted.

As can be derived from the above formula, the number of generated estimation coefficients $K_i$ depends on the filter order N and thus on the number of iterations, wherein the energy of the error curve e[n] between the actual values x[n] of the evaluation curve x[n] and the estimation value $\hat{x}[n]$ $$e[n] = x[n] - \hat{x}[n] = x[n] + \sum_{i=1}^{N} K_i x[n-i]$$

is minimized with each further iteration.

The original evaluation curve x[n] can thus be restored without loss for diagnostic purposes, for example, by determining incrementally the approximated evaluation curve $\hat{x}[n]$ from the estimation coefficients $K_i$ and the model of linear prediction, in order to generate the evaluation curve x[n] from it by addition with the error curve e[n]. Accordingly, the diagnostic unit can also comprise, for example, an FIR filter in lattice form for restoring the evaluation curve x[n].

The estimation coefficients $K_i$ can be determined on the basis of the least squares method. The optimum estimation coefficients $K_i$ are accordingly those with which the mean square deviation F of the error curve e[n] is minimized.

$$F = \sum_{n=-\infty}^{\infty} e^2[n]$$

As a condition for minimizing F, it is required that all partial derivatives of F after the filter coefficients $p_i$ is zero:

$$\frac{\partial F}{\partial p_i} = 2 \sum_{n=-\infty}^{\infty} \left( x[n] + \sum_{k=1}^{N} p_k * x[n-k] \right) * x[n-i] \stackrel{\Delta}{=} 0$$

Figure 3:
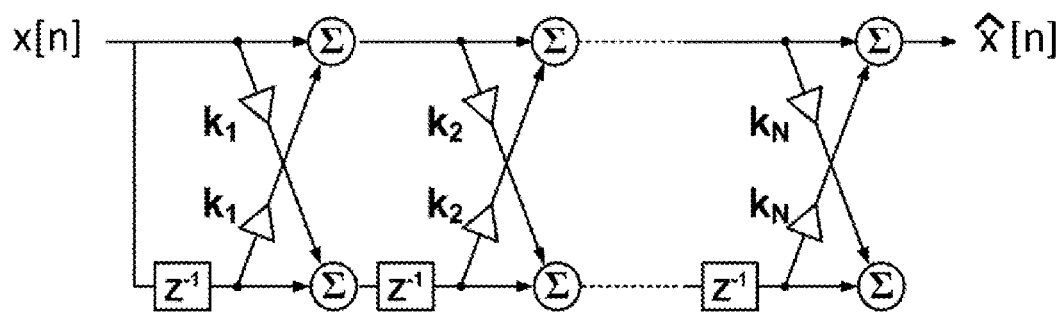
FIG. 3 shows the structure of an FIR filter in lattice form as a model of linear prediction.

On the basis of the derivatives, a linear equation system can be generated, the equations of which are known as "Wiener-Hopf equations." Suitable iterative methods can be used for the solution thereof, e.g. the so-called "Levinson-Durbin recursion" (see *Implementing the Levinson-Durbin Algorithm on the StarCore™ SC140/SC1400 Cores*", C. Margina & B: Costinescu, Freescale Semiconductor, 2005). In terms of software or hardware, this form of linear prediction can be implemented in the evaluation unit of the fill level measurement device 1 (or also in any diagnostic unit), for example by means of an FIR filter in lattice form, as shown in FIG. 3. In this case, $Z^{-1}$ are corresponding delay elements.

Through this implementation of linear prediction, the approximated evaluation curve $\hat{x}[n]$ or the estimation coefficients $K_i$ are generated iteratively such that the iteration is terminated as soon as the required memory space for the coefficients $K_i$ and the estimated memory requirement for the error curve e[n] become minimal.

In order to save further memory space, the evaluation unit of the fill level measurement device 1 can also compress the error curve e[n]. For this purpose, the method of entropy coding is especially suitable, as described, for example, in "*The Data Compression Book*", M. Nelson, J.-L. Gaily, Second Edition, M & T Books, 1996. Thereby, a logistic distribution is suitable as the underlying distribution model for error curve e[n], such that the original error curve e[n] can be represented by the compressed error curve ê[n] and the standard deviation a, which is characteristic for the logistic distribution (with mean value=0). Accordingly, in this case, in addition to the compressed error curve ê[n], only the standard deviation a of the error curve e[n] has to be transmitted or stored (besides the actual, approximated evaluation curve $\hat{x}[n]$). As a data compression method for entropy coding, so-called "range coding" or "Golomb coding" can be implemented in the evaluation unit.

The diagnostic unit can unpack the evaluation curve x[n] accordingly in that:
  The decompressed error curve e[n] is generated by means of entropy decoding of the compressed error curve e[n] and the corresponding statistical properties σ,
  The approximated evaluation curve $\hat{x}[n]$ is restored by means of the estimation coefficients $K_i$ on the basis of the model of linear prediction, and
  The evaluation curve x[n] is restored by adding the decompressed error curve ê[n] and the approximated evaluation curve $\hat{x}[n]$.

As a result, depending on the type of evaluation curve x[n], it is possible to achieve a compression factor of up to 2, without the compression resulting in a loss of data.

The invention claimed is:

1. A method for compressing an evaluation curve, which is recorded during a radar-based fill level measurement of a filling material located in a container, the method comprising:
   emitting a radar signal in the direction of the filling material;
   receiving a receive signal after reflection of the radar signal inside the container;
   recording an evaluation curve based on at least the receive signal; and
   generating an approximated evaluation curve ($\hat{x}[n]$) and associated estimation coefficients using a linear prediction of the evaluation curve, wherein the approximated evaluation curve ($\hat{x}[n]$) is defined as:

$$\hat{x}[n] = -\sum_{i=1}^{N} K_i x[n-i]$$

wherein x[n−i] is a previous value of the evaluation curve, and $K_i$ are the estimation coefficients.

2. The method according to claim 1, wherein an error curve is generated by subtracting the evaluation curve from the approximated evaluation curve.

3. The method according to claim 2, wherein the estimation coefficients are iteratively calculated using the linear prediction such that the iterative calculating is terminated when a data sum of the estimation coefficients and the error curve is minimized.

4. The method according to claim 2, wherein a compressed error curve is generated using entropy coding based on the error curve and its corresponding statistical properties.

5. The method according to claim 4, wherein a logistic distribution is used as the distribution model for the entropy coding, such that a standard deviation of the error curve is calculated as a statistical property.

6. The method according to claim 4, wherein range coding or Golomb coding is used as the data compression method for the entropy coding.

7. A method for decompressing the evaluation curve according to claim 4, the method comprising:

generating the decompressed error curve by using entropy decoding of the compressed error curve and of the corresponding statistical properties;

restoring the approximated evaluation curve by using the estimation coefficients based on the model of linear prediction; and restoring the evaluation curve using addition of the decompressed error curve and the approximated evaluation curve.

8. A radar-based fill level measurement device for performing the method according to claim 2, the fill level measurement device comprising:

a signal-generating unit configured to emit the radar signal in the direction of the filling material;

a receiving unit configured to receive the corresponding receive signal after reflection of the radar signal inside the container;

an evaluation unit configured to:

generate the evaluation curve based on at least the receive signal;

generate the approximated evaluation curve and its estimation coefficients, using at least one linear prediction of the evaluation curve;

generate the error curve by subtracting the evaluation curve from the approximated evaluation curve; and determine the fill level based on the evaluation curve or the estimation coefficients; and an interface which operable to transmit at least the estimation coefficients and the error curve, and/or a memory operable to store at least the estimation coefficients and the error curve.

9. The fill level measurement device according to claim 8, wherein the evaluation unit is designed to perform the linear prediction based on the lattice filter model.

10. The fill level measurement device according to claim 8, wherein the signal-generating unit, the receiving unit and the evaluation unit are designed to determine the evaluation curve based on the FMCW principle.

* * * * *